US007773347B2

United States Patent
Maejima et al.

(10) Patent No.: US 7,773,347 B2
(45) Date of Patent: Aug. 10, 2010

(54) ELECTROSTATIC PROTECTION FOR A MAGNETIC TAPE HEAD HAVING MULTIPLE MR READ ELEMENTS

(75) Inventors: Kazuhiko Maejima, Chuo-ku (JP);
Hiroshi Kamiyama, Chuo-ku (JP);
Tomonaga Nishikawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 769 days.

(21) Appl. No.: 11/723,073

(22) Filed: Mar. 16, 2007

(65) Prior Publication Data

US 2007/0230062 A1 Oct. 4, 2007

(30) Foreign Application Priority Data

Mar. 29, 2006 (JP) ............................. 2006-090989

(51) Int. Cl.
*G11B 5/39* (2006.01)
*G11B 5/29* (2006.01)
*G11B 5/40* (2006.01)

(52) U.S. Cl. ...................... 360/316; 360/128; 360/319; 360/323

(58) Field of Classification Search ................. 360/315, 360/316, 319, 121, 128, 323

See application file for complete search history.

(56) References Cited

U.S. PATENT DOCUMENTS

| 5,978,181 | A  | * | 11/1999 | Niijima et al. | ............... | 360/323 |
| 6,246,553 | B1 | * | 6/2001  | Biskeborn      | ................... | 360/323 |
| 7,486,476 | B2 | * | 2/2009  | Biskeborn      | ................... | 360/121 |
| 7,548,397 | B2 | * | 6/2009  | Biskeborn et al. | ........... | 360/121 |

FOREIGN PATENT DOCUMENTS

| JP | 62-012913 | 1/1987 |
| JP | 2002-100009 A | 4/2002 |

OTHER PUBLICATIONS

Japanese Office Action, 2006-090989, Feb. 21, 2009, pp. 1 and 2.

* cited by examiner

*Primary Examiner*—Craig A. Renner
*Assistant Examiner*—Gustavo Polo
(74) *Attorney, Agent, or Firm*—Frommer Lawrence & Haug, LLP

(57) ABSTRACT

A thin-film magnetic head has a plurality of MR read head elements. Each MR read head element includes shield layers electrically insulated from the ground. An electrical resistor layer is electrically connected between the shield layer of one of the plurality of MR read head elements and the shield layer of the other one of the plurality of MR read head elements.

17 Claims, 6 Drawing Sheets

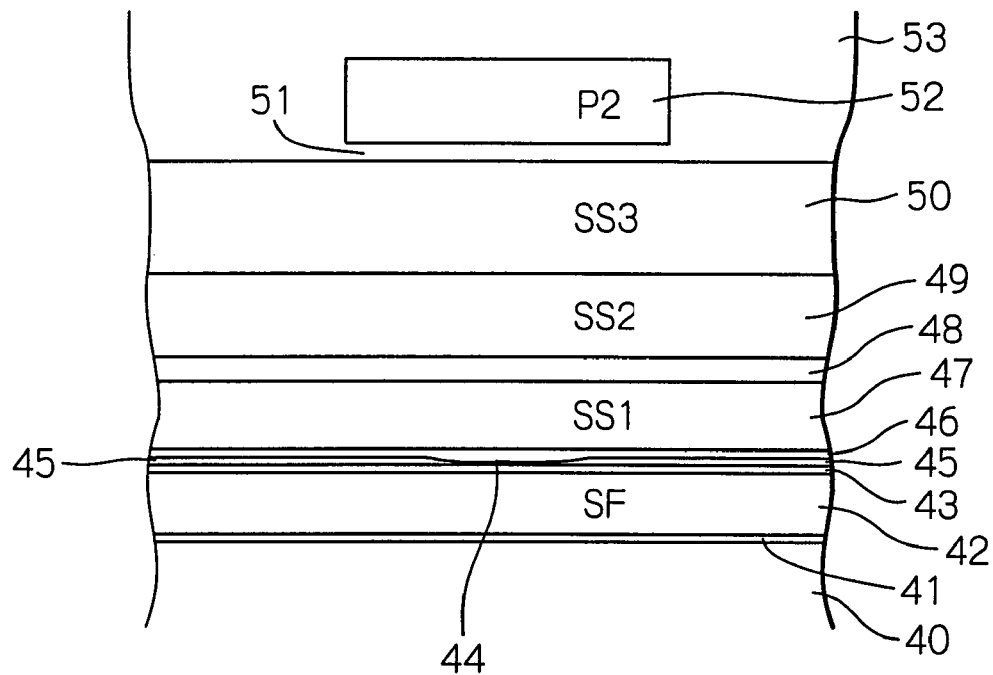
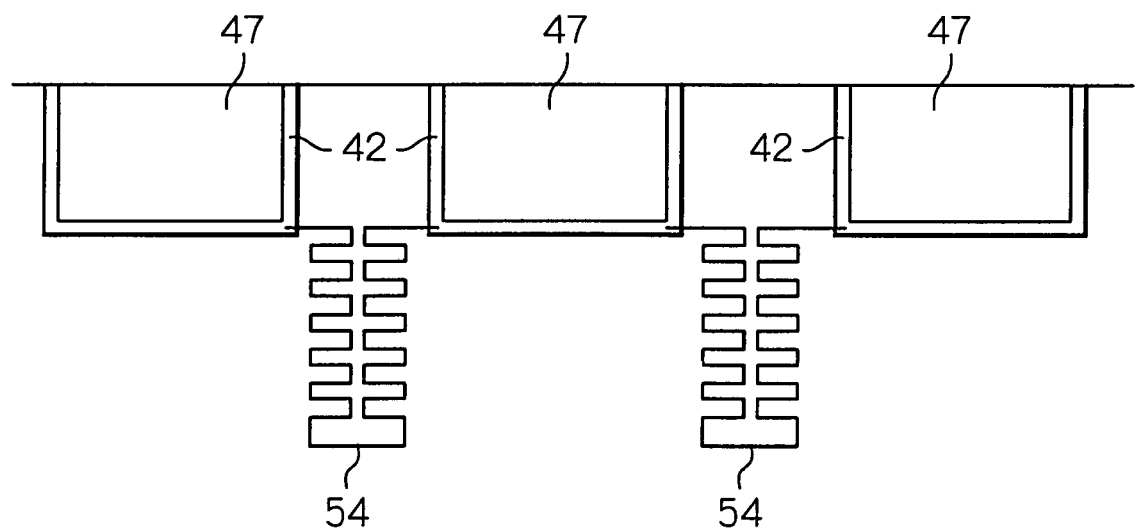

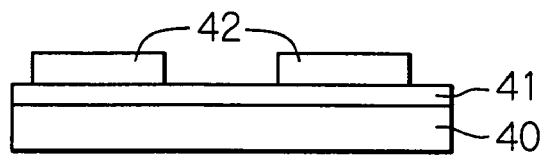
Fig. 6a
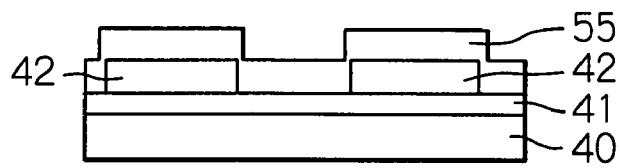
Fig. 6b
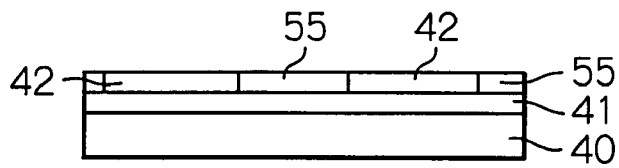
Fig. 6c
Fig. 6d
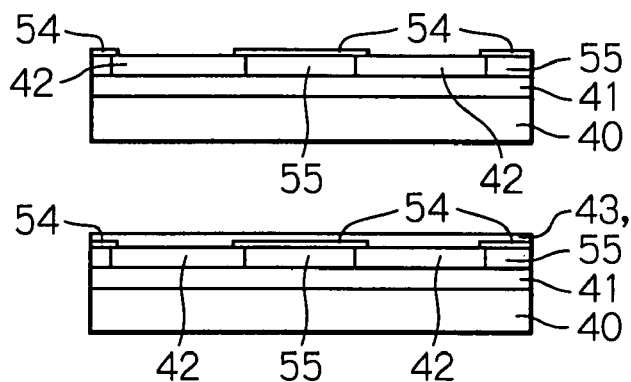
Fig. 6e
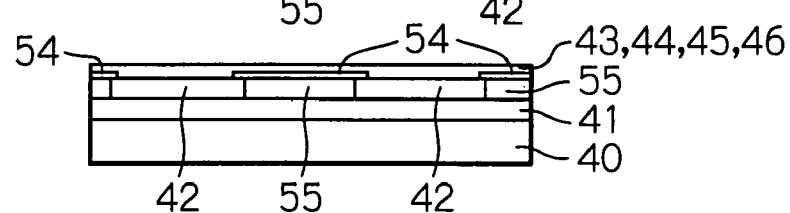
Fig. 6f
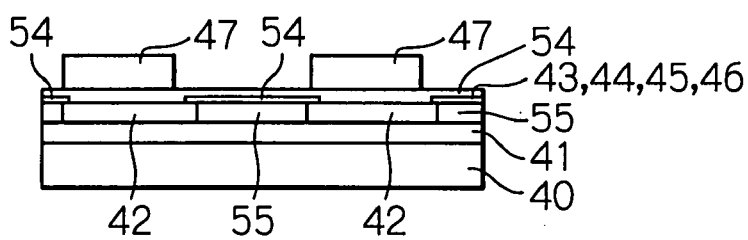
Fig. 6g
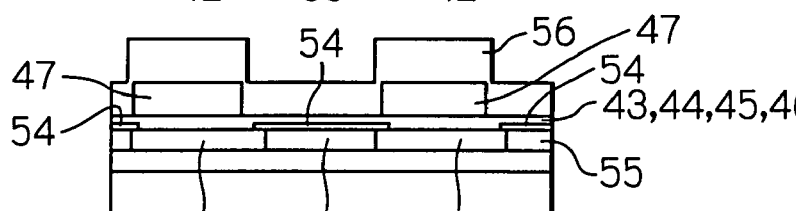
Fig. 6h
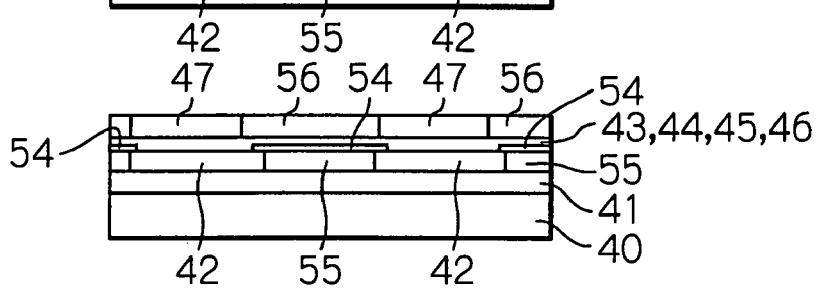

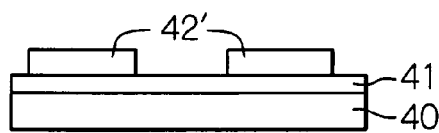
Fig. 8a
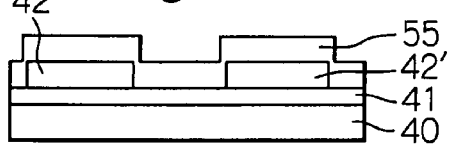
Fig. 8b
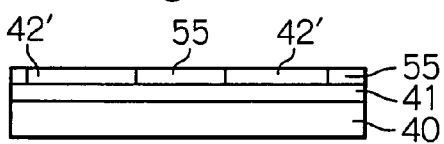
Fig. 8c
Fig. 8d
Fig. 8e
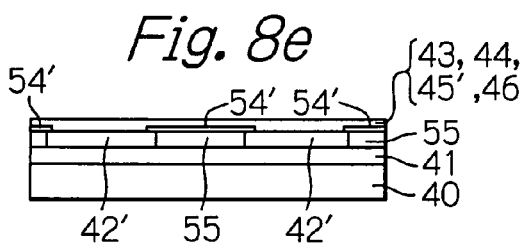
Fig. 8f
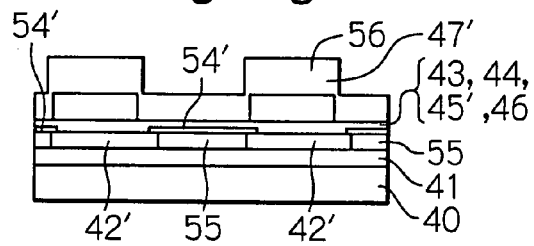
Fig. 8g
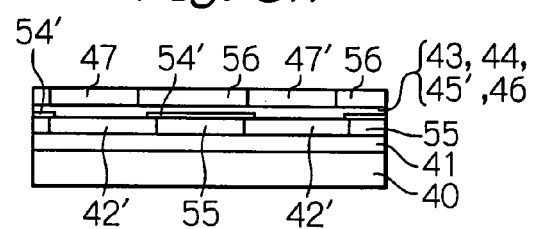
Fig. 8h
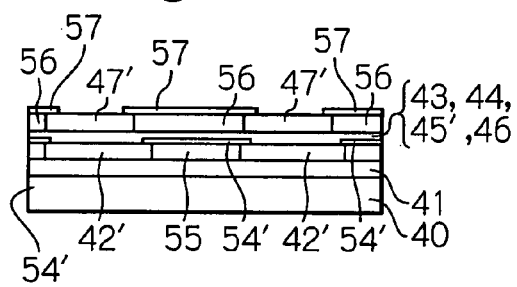
Fig. 8i
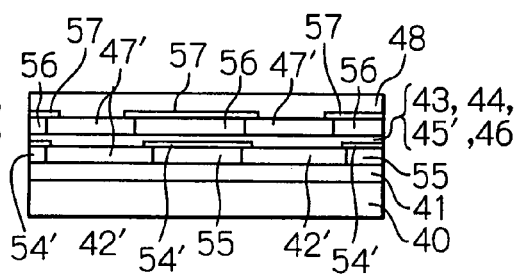
Fig. 8j
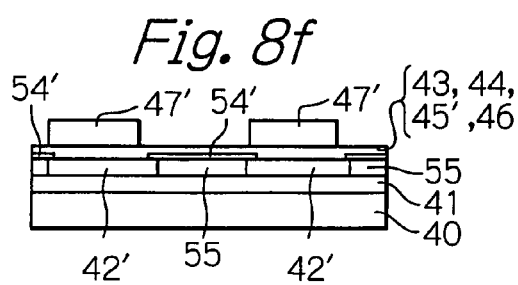

ELECTROSTATIC PROTECTION FOR A MAGNETIC TAPE HEAD HAVING MULTIPLE MR READ ELEMENTS

PRIORITY CLAIM

This application claims priority from Japanese patent application No. 2006-090989, filed on Mar. 29, 2006, which is incorporated herein by reference.

BACKGROUND OF THE INVENTION

1. Field of the Invention

The present invention relates to a thin-film magnetic head with a plurality of magnetoresistive effect (MR) read elements, and to a magnetic medium drive apparatus with this thin-film magnetic head.

2. Description of the Related Art

U.S. Pat. No. 6,246,553 discloses a magnetic head with an MR head element, in which electrical potential in the head and related charge accumulation are clamped by electrically connecting a shield layer and a lead line in the MR element each other through a resistor so as to prevent noise spike from occurring.

Japanese patent publication No. 2002-100009A discloses a magnetic head with an MR element, in which a ground for an MR film and a ground for a shield layer in the MR element are connected to the common ground so as to prevent electrostatic discharge (ESD) between the shield layers and the MR film.

According to such known techniques disclosed in U.S. Pat. No. 6,246,553 and Japanese patent publication No. 2002-100009A, the shield layers and the MR film are electrically connected each other. However, in some magnetic medium drive apparatuses, their specifications may require to absolutely provide electrical isolation between the shield layers and the MR film and, therefore, such known technique cannot be utilized at all. Also, in a giant magnetoresistive effect (GMR) read head element and a tunnel magnetoresistive effect (TMR) read head element with a current perpendicular plane (CPP) structure in which a sense current flows in a direction perpendicular to laminated layer surfaces or film surfaces, because the shield layers and the MR film are electrically connected inherently, no effect can be derived even if the shield layers and the MR film are electrically connected each other as done in the known technique.

Further, although the shield layers and the MR film are grounded according to the known technique disclosed in Japanese patent publication No. 2002-100009A, such known technique cannot be adopted to certain magnetic medium drive apparatuses in which both the shield layers and the MR film have to be not grounded for preventing entering of noises from the ground.

SUMMARY OF THE INVENTION

It is therefore an object of the present invention to provide a thin-film magnetic head and a magnetic medium drive apparatus, whereby influence of electrostatic discharge can be certainly prevented under the state where the shield layers and the MR film are electrically isolated from each other.

Another object of the present invention is to provide a thin-film magnetic head and a magnetic medium drive apparatus, whereby influence of electrostatic discharge can be certainly prevented under the state where the shield layers are electrically isolated from the ground.

According to the present invention, a thin-film magnetic head has a plurality of MR read head elements. Each MR read head element includes shield layers electrically insulated from the ground. An electrical resistor layer is electrically connected between the shield layer of one of the plurality of MR read head elements and the shield layer of the other one of the plurality of MR read head elements.

Each shield layer is floated from the ground, and instead, an electrical resistor layer is electrically connected between the respective shield layers of at least two of the MR read head elements. Thus, electrical charges in the shield layer one MR read head element escape into the shield layer of the other MR read head element through this electrical resistor layer so as to convert the electrical energy into heat energy at the electrical resistor layer. Therefore, the electrical energy of the electrical charges is extremely reduced. As a result, it is possible to certainly prevent destruction due to ESD of the MR read head elements without grounding the shield layers.

It is preferred that the shield layers of each MR read head element are a lower shield layer and an upper shield layer sandwich an MR layer with shield gap layers, and that the electrical resistor layer is electrically connected between the lower shield layer of one of the plurality of MR read head elements and the lower shield layer of the other one of the plurality of MR read head elements. In this case, each MR read head element may be a MR read head element with a current in plane (CIP) structure for passing a sense current in a direction parallel to a laminated surface of an MR layer, such as an anisotropic magnetoresistive effect (AMR) read head element or a CIP-GMR read head element. In the MR read head element with the CIP structure, because the lower shield layer and the upper shield layer are electrically conducted with each other in general, if the lower shield layers of the neighboring MR read head elements are connected through the electrical resistor layer, the upper shield layers of these MR read head elements will be similarly connected.

It is also preferred that another electrical resistor layer is electrically connected between the upper shield layer of one of the plurality of MR read head elements and the upper shield layer of the other one of the plurality of MR read head elements. In this case, each MR read head element may be an MR read head element with a structure for passing a sense current in a direction perpendicular to a laminated surface of an MR layer, such as a CPP-GMR read head element or a TMR read head element. In the MR read head element with the CPP structure, because the sense current flows through the GMR layer or the TMR layer, the lower shield layer and the upper shield layer are not electrically conducted in direct. Thus, it is necessary to connect not only the lower shield layers with each other through the electrical resistor layer but also the upper shield layers with each other through another electrical resistor layer.

It is further preferred that electrical resistor layers are electrically connected to the shield layers of all the plurality of MR read head elements.

It is still further preferred that the electrical resistor layer is a resistor layer formed in a zigzag pattern.

It is further preferred that the electrical resistor layer is a β-Ta layer

It is further preferred that the electrical resistor layer is a resistor layer with a resistance of 1-150 kΩ.

According to the present invention, also, a magnetic medium drive apparatus includes the aforementioned thin-film magnetic head, a magnetic medium faced the thin-film magnetic head in operation and a drive system for relatively moving the magnetic medium with respect to the thin-film magnetic head.

It is preferred that the magnetic medium is a magnetic tape.

Further objects and advantages of the present invention will be apparent from the following description of the preferred embodiments of the invention as illustrated in the accompanying drawings.

BRIEF DESCRIPTION OF THE DRAWINGS

FIG. 4 is a side view schematically illustrating a structure of each magnetic read/write head element of the thin-film magnetic head shown in FIG. 1, seen from the tape bearing surface (TBS);

FIG. 5 is a plane view illustrating a configuration of an electrical resistor layer in the thin-film magnetic head shown in FIG. 1;

FIGS. 6a to 6h are sectional views schematically illustrating a part of a wafer manufacturing process of the thin-film magnetic head shown in FIG. 1, seen from the TBS;

FIGS. 8a to 8j are sectional views schematically illustrating a part of a wafer manufacturing process of the thin-film magnetic head shown in FIG. 7, seen from the TBS.

DESCRIPTION OF THE PREFERRED EMBODIMENTS

Figure 1:
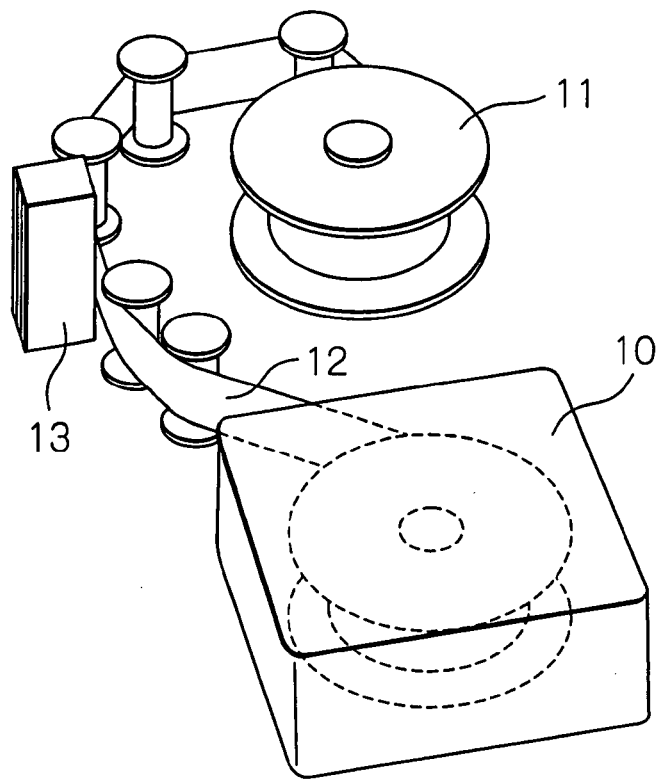
FIG. 1 is a perspective view schematically illustrating a configuration of a multi-channel magnetic tape drive apparatus as a preferred embodiment according to the present invention.
Figure 2:
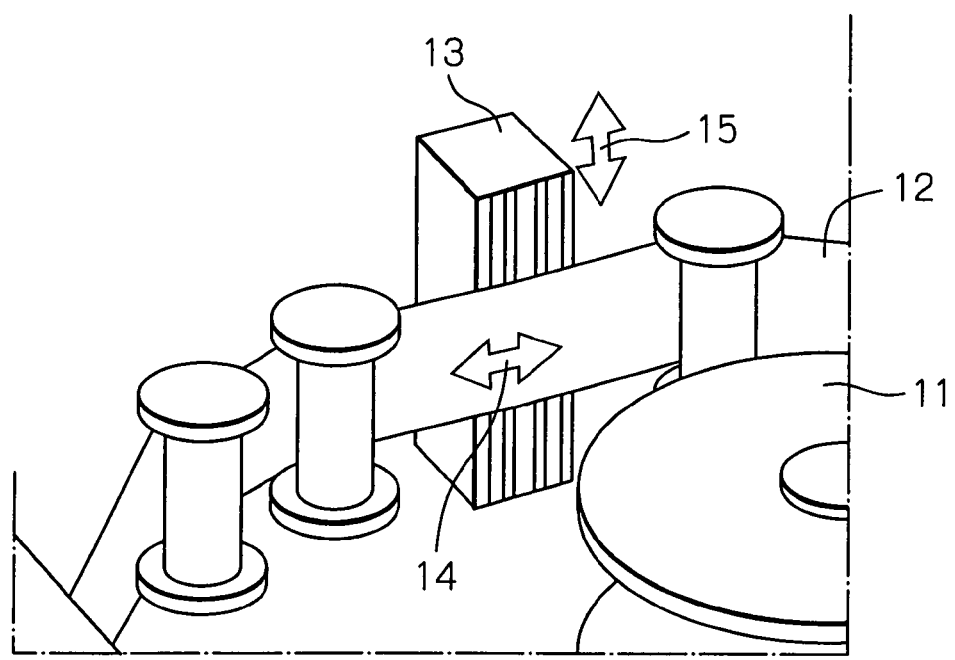
FIG. 2 is an enlarged perspective view illustrating the thin-film magnetic head shown in FIG. 1 and its surroundings.

FIG. 1 schematically illustrates a configuration of a multi-channel magnetic tape drive apparatus as a preferred embodiment according to the present invention, and FIG. 2 illustrates under magnification the thin-film magnetic head of this embodiment and its surroundings.

In this embodiment, the present invention applies for a linear tape open (LTO) tape drive apparatus. However, it should be noted that applications of the present invention are not limited to such LTO tape drive apparatus but the present invention can apply for any multi-channel tape drive apparatuses, any multi-channel disk drive apparatuses and any multi-channel drum drive apparatuses.

In FIGS. 1 and 2, reference numeral 10 denotes a tape cartridge with a single reel, 11 denotes a take-up reel for temporarily reeling a magnetic tape 12 taken from the tape cartridge 10, and 13 denotes a thin-film magnetic head capable of reciprocally moving in track-width directions or directions 15 perpendicular to the running directions 14 of the magnetic tape 12, respectively.

As is known, in the LTO system, information is read from and/or written into the magnetic tape 12 with the ½-inch width. Thus, the thin-film magnetic head 13 has a plurality of magnetic read/write elements and two servo read head elements.

Figure 3:
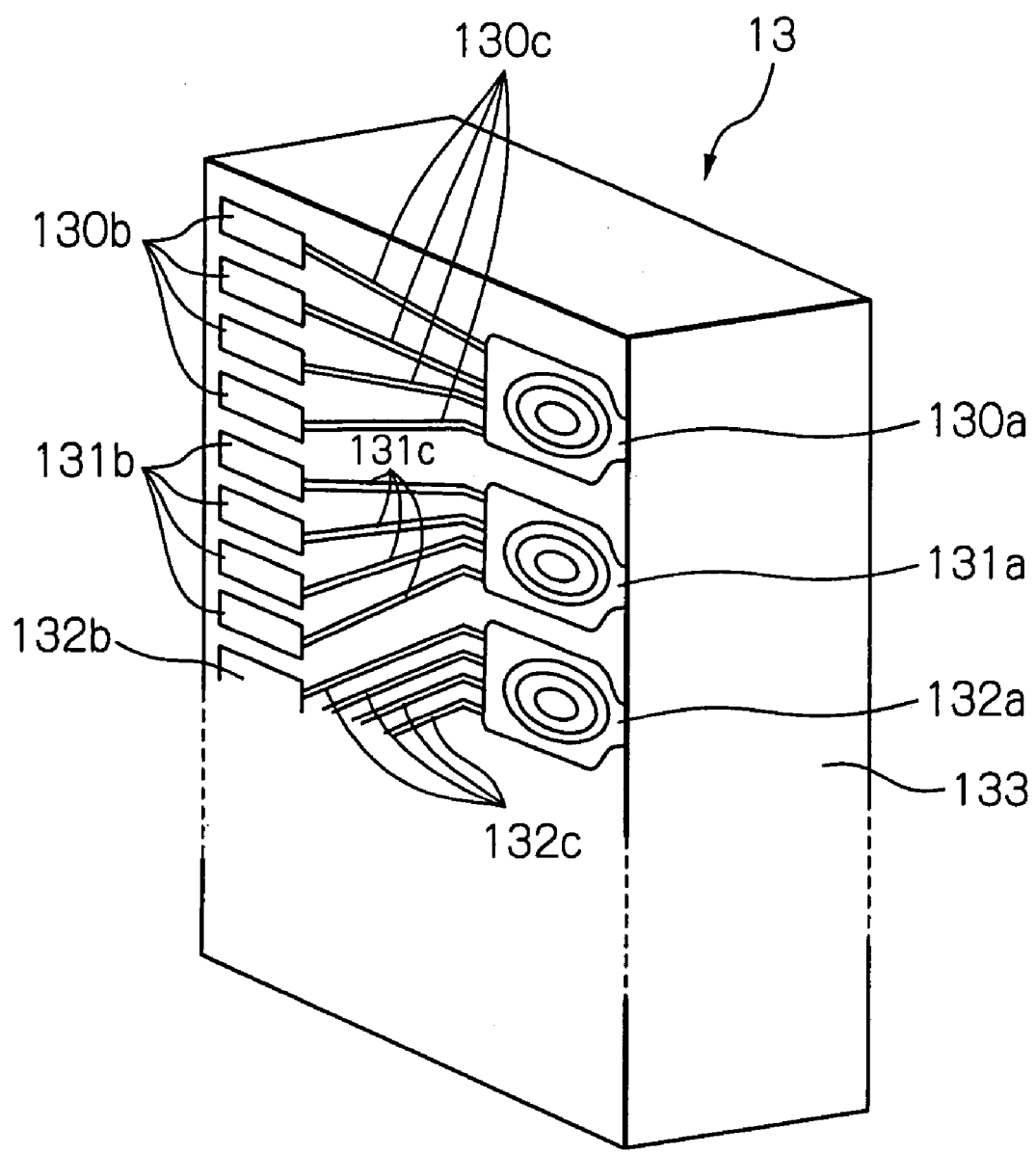
FIG. 3 is a perspective view schematically illustrating a configuration of the thin-film magnetic head shown in FIG. 1.

FIG. 3 schematically illustrates a configuration of the thin-film magnetic head 13 of this embodiment. In the figure, only three magnetic read/write head elements are illustrated and the remaining magnetic read/write head elements and a layer laminated on these magnetic read/write head elements are omitted from illustration in order to easily understand.

In the figure, reference numerals 130a, 131a and 132a denote three magnetic read/write head elements aligned along the track-width direction in a plane perpendicular to the TBS 133, 130b, 131b and 132b denote terminal electrodes for the magnetic read/write head elements 130a, 131a and 132a, and 130c, 131c and 132c denote lead conductors for electrically connecting the magnetic read/write head elements 130a, 131a and 132a with the terminal electrodes 130b, 131b and 132b, respectively.

FIG. 4 schematically illustrates a structure of each magnetic read/write head element of the thin-film magnetic head of this embodiment, showing a section seen from the TBS.

As shown in the figure, on a substrate 40 made of for example Al—TiC (Al$_2$O$_3$—TiC), an under layer 41 made of an insulation material such as Al$_2$O$_3$ for example is coated to have a thickness of for example 1.0 µm. On the under layer 41, laminated is a lower shield layer (SF) 42 made of a soft magnetic material such as sendust, NiFe or CoZrTa to have a thickness of for example 2.0±0.30 µm.

Although not shown in FIG. 4, electrical resistor layers 54 (FIGS. 5 and 6d-6h) for electrically connecting the lower shield layers 42 in the adjacent magnetic read/write head elements are formed on the lower shield layers 42 and on insulation layers 55 (FIGS. 6c-6h) made of for example Al$_2$O$_3$ laminated between the adjacent magnetic read/write head elements.

A lower shield gap layer 43 made of an insulation material such as Al$_2$O$_3$, SiO$_2$ for example is laminated to have a thickness of for example 100.0 µm on the lower shield layers 42 and on the electrical resistor layers 54 (FIGS. 5 and 6d-6h). On the lower shield gap layer 43, an MR layer 44, and the lead conductor layers and hard magnet layers for magnetic domain control 45 are laminated.

Each MR layer 44 in this embodiment is formed by an AMR layer with a multi-layered structure of NiFeCr (12.6 nm thickness)/NiFe (25.0 nm thickness)/Ta (3.5 nm thickness) laminated in this order from the bottom. Each lead conductor layer in this embodiment is formed by a conductive material such as Cu for example with a thickness of 200 nm, and each hard magnet layer in this embodiment is formed by a multi-layered structure of Ta (3.0 nm thickness)/CrTi (5.0 nm thickness)/CoCrPt (60.0 nm thickness)/CrTi (10.0 nm thickness)/Ta (100.0 nm thickness) laminated in this order from the bottom.

On the MR layer 44 and the lead conductor layers and hard magnet layers for magnetic domain control 45, laminated is an upper shield gap layer 46 made of an insulation material such as Al$_2$O$_3$, SiO$_2$ for example to have a thickness of for example 100.0 µm. On the upper shield gap layer 46, an upper shield layer (SS1) 47 made of a soft magnetic material such as NiFe for example is laminated to have a thickness of for example 2.0±0.3 µm. On the upper shield layer 47, an intermediate nonmagnetic layer 48 made of a nonmagnetic material such as Ta for example is laminated to have a thickness of for example 0.020±0.002 nm.

On the intermediate nonmagnetic layer 48, laminated is a lower magnetic pole downside layer (SS2) 49 of the inductive write head element, made of a soft magnetic material such as NiFe for example to have a thickness of for example 2.0±0.3 µm. A lower magnetic pole upside layer (SS3) 50 made of a soft magnetic material such as NiFe with a high coercivity (HiBs) for example is laminated on the to have a thickness of for example 3.5±0.3 µm. On the lower magnetic pole upside layer 50, a recording gap layer 51 made of an insulation material such as Al$_2$O$_3$ for example is laminated to have a thickness of for example 0.45 µm. An upper magnetic pole layer (P2) 52 made of a soft magnetic material such as NiFe with a high coercivity for example is laminated on the lower magnetic pole upside layer 50, and an over coat layer 53 made of an insulation material such as $Al_2O_3$ for example is laminated on the upper magnetic pole layer 52 to have a thickness of for example 41 +5/−2 μm.

In stead of the AMR layer, a CIP-GMR layer may be used as for the MR layer 44.

FIG. 5 illustrates a configuration of an electrical resistor layer in the thin-film magnetic head of this embodiment.

As shown in the figure, according to this embodiment, electrical resistor layers 54 are electrically connected between the lower shield layers 42 of neighboring read/write magnetic head elements. Each electrical resistor layer 54 in this embodiment is formed by sputtering a tetragonal β-Ta layer that is under metastable phase in a zigzag pattern as shown in the figure so as to have a high resistance value of 1-150 kΩ. If the resistance of the electrical resistor layer 54 is lower than 1 kΩ, it is difficult to exhaust the electrical energy by converting it into heat energy. Contrary to this, it is quite difficult to form an electrical resistor layer with a resistance higher than 150 kΩ in such thin-film magnetic head. In the AMR read head element or CIP-GMR read head element, in general, the lower shield layer 42 and the upper shield layer 47 are electrically conducted in direct. Therefore, if the lower shield layers 42 of the neighboring read/write magnetic head elements are connected through the electrical resistor layer, the upper shield layers 47 of these read/write magnetic head elements will be similarly connected.

In fact, a β-Ta layer was formed in a pattern with a width of W=2 μm, a thickness of t=0.02 μm and a length of L=950 μm, and thus an electrical resistor layer 54 with a resistance of about 40 kΩ was obtained.

In the example shown in FIG. 5, the electrical resistor layers are connected between the lower shield layers of all of the neighboring read/write magnetic head elements, respectively. However, in a modification, the electrical resistor layers may be connected between the lower shield layers of a part of the neighboring read/write magnetic head elements. Also, in another modification, the electrical resistor layer may be connected between the lower shield layers of the read/write magnetic head elements that are not neighbored each other.

FIGS. 6a to 6h schematically illustrate a part of a wafer manufacturing process of the thin-film magnetic head of this embodiment, showing sections seen from the TBS. In these figures, illustrated is a partial wafer process until upper shield layers of two neighboring read/write magnetic head elements are fabricated.

First, as shown in FIG. 6a, the substrate 40 on which the under layer 41 has been already coated is prepared and then the lower shield layers 42 are laminated on the under layer 41.

Then, as shown in FIG. 6b, an insulation material for the insulation layers 55 is deposited thereon.

Then, as shown in FIG. 6c, upper surfaces of the lower shield layers 42 and the insulation layers 55 are flattened by chemical mechanical polishing (CMP).

Then, as shown in FIG. 6d, the electrical resistor layers 54 are patterned on the flattened surfaces by sputtering.

Then, as shown in FIG. 6e, films for the lower shield gap layers 43, the MR layers 44, the lead conductor layers and hard magnet layers for magnetic domain control 45 and the upper shield gap layers 46 are laminated thereon.

Then, as shown in FIG. 6f, on the upper shield gap layers 46, the upper shield layers 47 are laminated.

Then, as shown in FIG. 6g, an insulation material for the insulation layers 56 is deposited thereon.

Then, as shown in FIG. 6h, upper surfaces of the upper shield layers 47 and the insulation layers 56 are flattened by CMP.

Thereafter, the intermediate nonmagnetic layer 48 is laminated on the flattened surfaces of the upper shield layers 47 and the insulation layers 56, and then inductive write head elements are formed on the intermediate nonmagnetic layer 48.

Then, thin-film magnetic heads with a plurality of read/write magnetic head elements formed on the wafer are separated and machine worked to fabricate thin-film magnetic head.

As described in detail, according to this embodiment, because the electrical resistor layers 54 each having a high resistance value of 1-150 kΩ are electrically connected between the lower shield layers 42 of neighboring read/write magnetic head elements, electrical charges in the upper shield layer 47 and/or the lower shield layer 42 of one MR read head element escape into the lower shield layer 42 of the other MR read head element through this electrical resistor layer 54 so as to convert the electrical energy into heat energy at the electrical resistor layer 54. Thus, the electrical energy of the electrical charges is extremely reduced. As a result, it is possible to certainly prevent destruction due to ESD of the MR read head elements without grounding the lower shield layers.

Difference in rate of MR resistance change between this embodiment where an electrical resistor layer is connected across the lower shield layers of the neighboring read/write magnetic head elements and the prior art where no electrical resistor layer is connected was examined by measuring their MR outputs while magnetic tapes were actually run through these read/write magnetic head elements. Table 1 represents the measured result. The measurement was conducted at a temperature of 85° C., a relative humidity of 10-20% RH, a tape running speed of 4 m/sec and a tape running time of 240 hours. The number of samples with respect to this embodiment was 800 and that of samples with respect to the prior art was 800. The sample with a rate of MR resistance change lower than 5% was considered as defective.

TABLE 1

| | | After 24 Hours | After 48 Hours | After 98 Hours | After 240 Hours |
|---|---|---|---|---|---|
| Prior Art | The Number of Defectives | 2 | 5 | 12 | 47 |
| | Rate of Defectives (%) | 0.3 | 0.6 | 1.5 | 5.9 |
| This Embodiment | The Number of Defectives | 0 | 1 | 1 | 4 |
| | Rate of Defectives (%) | 0.0 | 0.1 | 0.1 | 0.5 |

It will be noted, from Table 1, that when the tape running time becomes long, defectives due to ESD abruptly increases in the samples with respect to the prior art where no electrical resistor layer is formed but defectives due to ESD does not so increase in the samples with respect to the this embodiment where an electrical resistor layer is formed. Therefore, it is understood that forming of the electrical resistor layer is extremely effective countermeasure against ESD.

Figure 7:
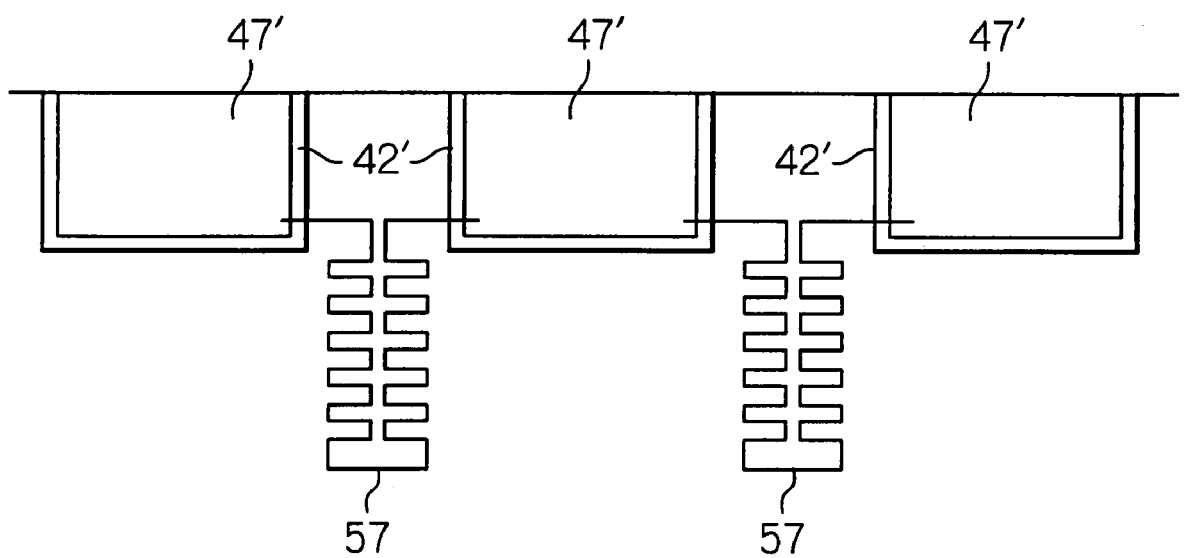
FIG. 7 is a plane view illustrating a configuration of an electrical resistor layer in a thin-film magnetic head in another embodiment according to the present invention.

FIG. 7 illustrates a configuration of second electrical resistor layers in a thin-film magnetic head in another embodiment according to the present invention. In this embodiment, the configuration of the multi-channel tape drive apparatus is the same as that shown in FIGS. 1 and 2. Also, the thin-film magnetic head of this embodiment resembles that shown in FIG. 3 in appearance. However, in this embodiment, CPP-GMR read head elements or TMR read head elements are used as for the MR read head elements, and electrical resistor layers are formed not only in the lower shield layer side but also in the upper shield layer side in comparison with the embodiment shown in FIGS. 1 to 6h. In this embodiment therefore the same reference numerals or reference numerals with dashes are used as for components similar to these in the embodiment of FIGS. 1 to 6h.

According to this embodiment, first electrical resistor layers 54' are electrically connected between the lower shield layers 42' of neighboring read/write magnetic head elements as similarly shown in FIG. 5, and, in addition, second electrical resistor layers 57 are electrically connected between the upper shield layers 47' of the neighboring read/write magnetic head elements as shown in FIG. 7. Each of the first and second electrical resistor layer 54' and 57 in this embodiment is formed by sputtering a tetragonal β-Ta layer that is under metastable phase in a zigzag pattern as shown in FIGS. 5 and 7 so as to have a high resistance value of 1-150 kΩ.

In fact, a β-Ta layer was formed in a pattern with a width of W=2 μm, a thickness of t=0.02 μm and a length of L=950 μm, and thus a first or second electrical resistor layer 54' or 57 with a resistance of about 40 kΩ was obtained.

In the example shown in FIGS. 5 and 7, the first and second electrical resistor layers are connected between the lower and upper shield layers of all of the neighboring read/write magnetic head elements, respectively. However, in a modification, the first and second electrical resistor layers may be connected between the lower and upper shield layers of a part of the neighboring read/write magnetic head elements. Also, in another modification, the first and second electrical resistor layer may be connected between the lower and upper shield layers of the read/write magnetic head elements that are not neighbored each other.

FIGS. 8a to 8j schematically illustrate a part of a wafer manufacturing process of the thin-film magnetic head of this embodiment, showing sections seen from the TBS. In these figures, illustrated is a partial wafer process until upper shield layers of two neighboring read/write magnetic head elements are fabricated.

First, as shown in FIG. 8a, the substrate 40 on which the under layer 41 has been already coated is prepared and then lower shield layers that also serve as lower electrode layers 42' are laminated on the under layer 41.

Then, as shown in FIG. 8b, an insulation material for the insulation layers 55 is deposited thereon.

Then, as shown in FIG. 8c, upper surfaces of the lower shield layers 42' and the insulation layers 55 are flattened by CMP.

Then, as shown in FIG. 8d, the first electrical resistor layers 54' are patterned on the flattened surfaces by sputtering.

Then, as shown in FIG. 8e, films for the lower shield gap layers 43, the MR layers 44, the lead conductor layers and hard magnet layers for magnetic domain control 45' and the upper shield gap layers 46 are laminated thereon. It should be noted that in this embodiment the MR layers 44 are CPP-GMR layers or TMR layers.

Then, as shown in FIG. 8f, on the upper shield gap layers 46, upper shield layers that also serve as upper electrode layers 47' are laminated.

Then, as shown in FIG. 8g, an insulation material for the insulation layers 56 is deposited thereon.

Then, as shown in FIG. 8h, upper surfaces of the upper shield layers 47' and the insulation layers 56 are flattened by CMP.

Then, as shown in FIG. 8i, the second electrical resistor layers 57 are patterned on the flattened surfaces by sputtering.

Thereafter, as shown in FIG. 8j, the intermediate nonmagnetic layer 48 is laminated on the flattened surfaces of the upper shield layers 47' and the insulation layers 56, and then inductive write head elements are formed on the intermediate nonmagnetic layer 48.

Then, thin-film magnetic heads with a plurality of read/write magnetic head elements formed on the wafer are separated and machine worked to fabricate thin-film magnetic head.

As described in detail, according to this embodiment, also, because the first electrical resistor layers 54' each having a high resistance value of 1-150 kΩ are electrically connected between the lower shield layers 42' of neighboring read/write magnetic head elements and the second electrical resistor layers 57 each having a high resistance value of 1-150 kΩ are electrically connected between the upper shield layers 47' of the neighboring read/write magnetic head elements, electrical charges in the lower shield layer 42' and/or the upper shield layer 47' of one MR read head element escape into the lower shield layer 42' and/or the upper shield layer 47' of the other MR read head element through the first electrical resistor layer 54' and/or the second electrical resistor layer 57 so as to convert the electrical energy into heat energy at the first electrical resistor layer 54' and/or the second electrical resistor layer 57. Thus, the electrical energy of the electrical charges is extremely reduced. As a result, it is possible to certainly prevent destruction due to ESD of the MR read head elements without grounding the lower shield layers and/or the upper shield layers.

In the aforementioned embodiments, described is improvement in ESD prevention performance during running of tape. However, the thin-film magnetic head and the magnetic medium drive apparatus according to the present invention can also extremely improve ESD prevention performance during its manufacturing process.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head with a plurality of magnetoresistive effect read head elements, each magnetoresistive effect read head element including a lower shield layer and an upper shield layer electrically insulated from the ground, said lower shield layer and said upper shield layer sandwiching a magnetoresistive effect layer with shield gap layers, an electrical resistor layer being electrically connected between the lower shield layer of one of said plurality of magnetoresistive effect read head elements and the lower shield layer of the other one of said plurality of magnetoresistive effect read head elements.

2. The thin-film magnetic head as claimed in claim 1, wherein each magnetoresistive effect read head element comprises a magnetoresistive effect read head element with a structure for passing a sense current in a direction parallel to a laminated surface of a magnetoresistive effect layer.

3. The thin-film magnetic head as claimed in claim 1, wherein another electrical resistor layer is electrically connected between the upper shield layer of one of said plurality of magnetoresistive effect read head elements and the upper shield layer of the other one of said plurality of magnetoresistive effect read head elements.

4. The thin-film magnetic head as claimed in claim 3, wherein each magnetoresistive effect read head element comprises a magnetoresistive effect read head element with a structure for passing a sense current in a direction perpendicular to a laminated surface of a magnetoresistive effect layer.

5. The thin-film magnetic head as claimed in claim 1, wherein electrical resistor layers are electrically connected to the shield layers of all the plurality of magnetoresistive effect read head elements.

6. The thin-film magnetic head as claimed in claim 1, wherein said electrical resistor layer comprises a resistor layer formed in a zigzag pattern.

7. The thin-film magnetic head as claimed in claim 1, wherein said electrical resistor layer comprises a β-Ta layer.

8. The thin-film magnetic head as claimed in claim 1, wherein said electrical resistor layer comprises a resistor layer with a resistance of 1-150 kΩ.

9. A magnetic medium drive apparatus including a thin-film magnetic head, a magnetic medium faced said thin-film magnetic head in operation, and a drive system for relatively moving said magnetic medium with respect to said thin-film magnetic head, said thin-film magnetic head having a plurality of magnetoresistive effect read head elements, each magnetoresistive effect read head element including a lower shield layer and an upper shield layer electrically insulated from the ground, said lower shield layer and said upper shield layer sandwiching a magnetoresistive effect layer with shield gap layers, an electrical resistor layer being electrically connected between the lower shield layer of one of said plurality of magnetoresistive effect read head elements and the lower shield layer of the other one of said plurality of magnetoresistive effect read head elements.

10. The magnetic medium drive apparatus as claimed in claim 9, wherein each magnetoresistive effect read head element of said thin-film magnetic head comprises a magnetoresistive effect read head element with a structure for passing a sense current in a direction parallel to a laminated surface of a magnetoresistive effect layer.

11. The magnetic medium drive apparatus as claimed in claim 9, wherein another electrical resistor layer is electrically connected between the upper shield layer of one of said plurality of magnetoresistive effect read head elements and the upper shield layer of the other one of said plurality of magnetoresistive effect read head elements.

12. The magnetic medium drive apparatus as claimed in claim 11, wherein each magnetoresistive effect read head element of said thin-film magnetic head comprises a magnetoresistive effect read head element with a structure for passing a sense current in a direction perpendicular to a laminated surface of a magnetoresistive effect layer.

13. The magnetic medium drive apparatus as claimed in claim 9, wherein electrical resistor layers of said thin-film magnetic head are electrically connected to the shield layers of all the plurality of magnetoresistive effect read head elements.

14. The magnetic medium drive apparatus as claimed in claim 9, wherein said electrical resistor layer of said thin-film magnetic head comprises a resistor layer formed in a zigzag pattern.

15. The magnetic medium drive apparatus as claimed in claim 9, wherein said electrical resistor layer of said thin-film magnetic head comprises a β-Ta layer.

16. The magnetic medium drive apparatus as claimed in claim 9, wherein said electrical resistor layer of said thin-film magnetic head comprises a resistor layer with a resistance of 1-150 kΩ.

17. The magnetic medium drive apparatus as claimed in claim 9, wherein said magnetic medium comprises a magnetic tape.

* * * * *